(12) United States Patent
Zhou et al.

(10) Patent No.: US 7,755,328 B2
(45) Date of Patent: Jul. 13, 2010

(54) CHARGING CIRCUIT

(75) Inventors: Tong Zhou, Shenzhen (CN); Kun Le, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 676 days.

(21) Appl. No.: 11/725,912

(22) Filed: Mar. 19, 2007

(65) Prior Publication Data

US 2007/0216370 A1    Sep. 20, 2007

(30) Foreign Application Priority Data

Mar. 17, 2006    (TW) .............................. 95109286 A

(51) Int. Cl.
*H02J 7/04*        (2006.01)
(52) U.S. Cl. .................. 320/145; 320/148; 320/149; 320/150; 320/155; 320/162
(58) Field of Classification Search .............. 320/145, 320/149
See application file for complete search history.

(56) References Cited

U.S. PATENT DOCUMENTS

| | | | | |
|---|---|---|---|---|
| 4,656,411 A | * | 4/1987 | Carlson | 320/116 |
| 5,382,893 A | * | 1/1995 | Dehnel | 320/160 |
| 5,900,717 A | * | 5/1999 | Lee | 320/150 |
| 6,476,585 B1 | * | 11/2002 | Simmonds | 320/162 |
| 6,794,851 B2 | | 9/2004 | Murakami et al. | |
| 7,012,405 B2 | | 3/2006 | Nishida et al. | |

FOREIGN PATENT DOCUMENTS

CN    1564421 A    1/2005
EP    0390079 A2    10/1990

OTHER PUBLICATIONS

On Semiconductor, PWM Current—Mode Controller for Universal Off-Line Supplies Featuring Standby and Short Circuit Protection, Mar. 2005- Rev.6; http://onsemi.com.*

* cited by examiner

*Primary Examiner*—Edward Tso
*Assistant Examiner*—Yalkew Fantu
(74) *Attorney, Agent, or Firm*—Wei Te Chung

(57) ABSTRACT

An exemplary charging circuit (200) includes for charging a load component (210) includes a power supply unit (220), a feedback circuit, and a sampling resistor (230). The power supply unit includes a pulse width modulation circuit (221) and a power output terminal (222) configured to output a direct current supply. The feedback circuit includes an amplifying comparator (241), a constant voltage circuit (242), a transistor (243), and an optoelectrical coupler (244). The constant voltage circuit is configured to generate a reference voltage and apply the reference voltage to a negative input terminal of the amplifier comparator. An output terminal of the amplifier comparator is connected to the pulse width modulation circuit via the transistor and the optoelectrical coupler. The sampling resistor includes a current sampling terminal connected to a positive input terminal of the amplifier comparator.

20 Claims, 3 Drawing Sheets

CHARGING CIRCUIT

FIELD OF THE INVENTION

The present invention relates to charging circuits, and particularly to a charging circuit for charging batteries.

GENERAL BACKGROUND

Recently, portable electronic apparatuses such as mobile phones, notebook computers, and personal digital assistants (PDAs) have gained widespread used. These portable electronic apparatuses are commonly equipped with one or more rechargeable batteries. In order to ensure portability of such portable electronic apparatuses, a separate battery charger is required for charging the batteries of the portable electronic apparatus.

Referring to FIG. 3, a charging circuit 100 of a typical battery charger is shown. The charging circuit 100 includes a power supply unit 110, a load circuit 120, a transistor 131, an amplifier comparator 132, a feedback resistor 1321, two voltage-dividing resistors 1322, 1323, and a sampling resistor 140. The power supply unit 110 includes a power output terminal 111 and a grounding terminal 112. The transistor 131 includes a gate electrode 1311, a source electrode 1312, and a drain electrode 1313.

One terminal of the sampling resistor 140 is connected to the grounding terminal 112 of the power supply unit 110. The other terminal of the sampling resistor 140, namely a current sampling terminal, is connected to the power output terminal 111 of the power supply unit 110 via the load circuit 120, the drain electrode 1313 of the transistor 131, and the source electrode 1312 of the transistor 131. The drain electrode 1313 of the transistor 131 is connected to the grounding terminal 112 of the power supply unit 110 via the two voltage-dividing resistors 1322, 1323. A node between the two voltage-dividing resistors 1322, 1323 is connected to a negative input terminal of the amplifier comparator 132. The current sampling terminal of the sampling resistor 140 is connected to a positive input terminal of the amplifier comparator 132. An output terminal of the amplifier comparator 132 is connected to the gate electrode 1311 of the transistor 131. Two terminals of the feedback resistor 1321 are connected with the output terminal and the negative input terminal of the amplifier comparator 132, respectively. That is, the feedback resistor 1321 is connected with the amplifier comparator 132 in parallel.

The power supply unit 110 transforms alternating current to direct current having a lower voltage, and charges the load circuit 120 through the power output terminal 111. The amplifier comparator 132 switches the transistor 131 to control a charging current and a charging voltage of the charging circuit 100. When the charging circuit 100 works normally, the transistor 131 is in an on-state, and the charging current travels through the transistor 131. However, because the transistor 131 has high power, a large heat sink is needed. Thus, a volume of space required by the charging circuit 100 is large.

Therefore, a new charging circuit that can overcome the above-described problems is desired.

SUMMARY

In one preferred embodiment, a charging circuit for charging a load component includes a power supply unit, a feedback circuit, and a sampling resistor. The power supply unit includes a pulse width modulation circuit and a power output terminal configured to output a direct current supply. The feedback circuit includes an amplifying comparator, a constant voltage circuit, a transistor, and an optoelectrical coupler. The constant voltage circuit is configured to generate a reference voltage and apply the reference voltage to a negative input terminal of the amplifier comparator. An output terminal of the amplifier comparator is connected to the pulse width modulation circuit via the transistor and the optoelectrical coupler. The sampling resistor includes a current sampling terminal connected to a positive input terminal of the amplifier comparator. The charging circuit is configured such that when the load component is coupled to the direct current supply of the charging circuit and a direct current traveling through the load component changes, the amplifier comparator generates a feedback signal and applies the feedback signal to the pulse width modulation circuit via the transistor and the optoelectrical coupler, and the pulse width modulation circuit adjusts the direct current supply output from the power output terminal according the feedback signal to stabilize the current traveling through the load component.

Other novel features and advantages will become more apparent from the following detailed description when taken in conjunction with the accompanying drawings.

DETAILED DESCRIPTION OF PREFERRED EMBODIMENTS

Figure 1:
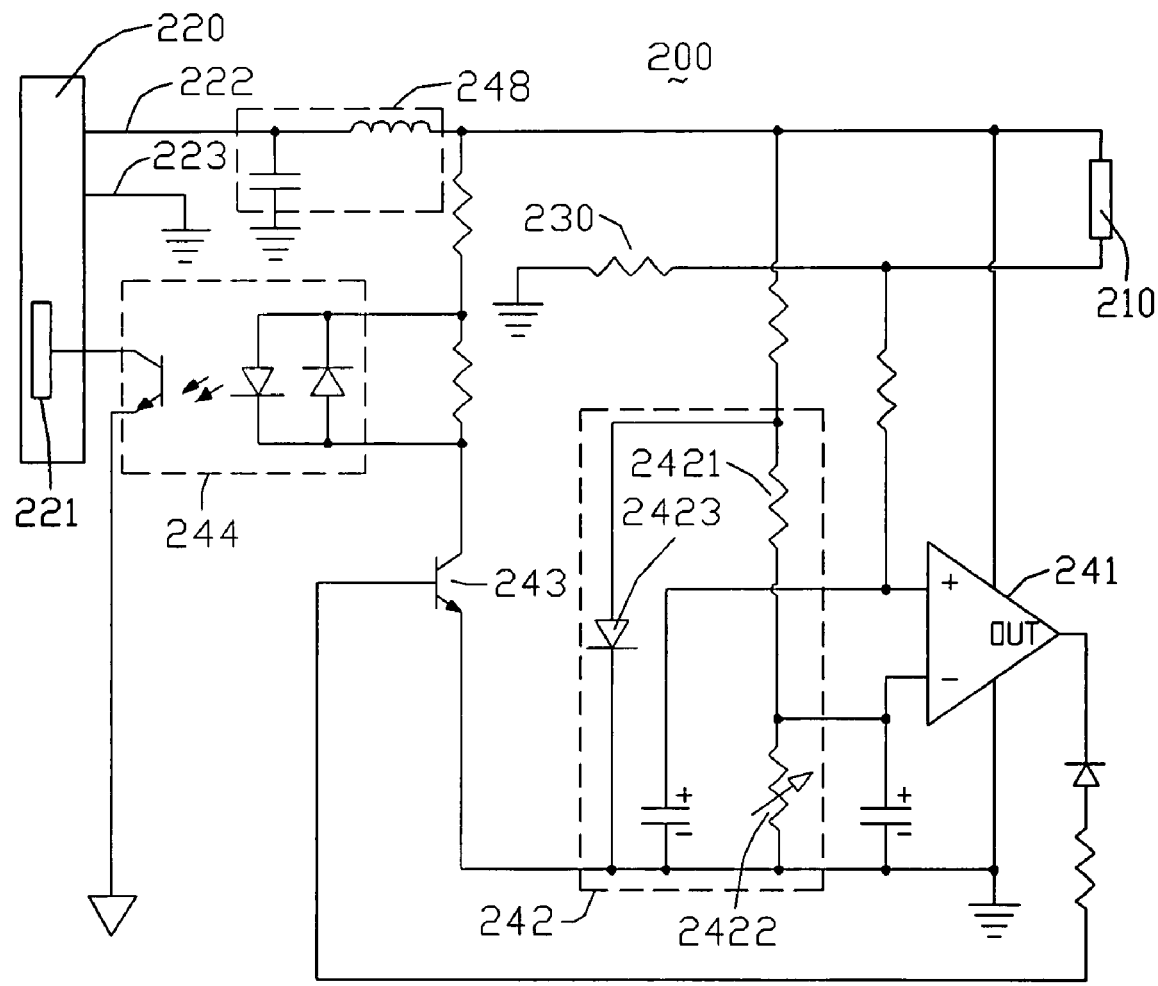
FIG. 1 is a diagram of a charging circuit according to a first embodiment of the present invention.

Referring to FIG. 1, a charging circuit 200 according to a first embodiment of the present invention is shown. The charging circuit 200 includes a load component 210, a power supply unit 220, a sampling resistor 230, a rectifier-filter circuit 248, and a feedback circuit (not labeled). The load component 210 can be a rechargeable battery, such as a lithium ion rechargeable battery or a nickel-cadmium rechargeable battery.

The power supply unit 220 includes a pulse width modulation (PWM) circuit 221, a power output terminal 222, and a grounding terminal 223. The PWM circuit 221 is integrated in the power supply unit 220 by a full bridge rectifier circuit or a half bridge rectifier circuit. The power supply unit 220 transforms a commercial power supply having a voltage of 110V or 220V into a direct current power supply, and outputs the direct current power supply through the power output terminal 222. In the illustrated embodiment, the PWM circuit 221 is an NCP1203 type PWM circuit.

The rectifier-filter circuit 248 rectifies and filters the direct current supply from the power output terminal 222.

One terminal of the sampling resistor 230 is grounded. The other terminal of the sampling resistor 230, namely a current sampling terminal, is connected to the power output terminal 222 of the power supply unit 220 via the load component 210. In the illustrated embodiment, a resistance of the sampling resistor 230 is 0.2Ω.

The feedback circuit includes an amplifier comparator 241, a constant voltage circuit 242, a transistor 243, and an optoelectrical coupler 244. A positive input terminal of the amplifier comparator 241 is connected to the current sampling terminal of the sampling resistor 230. An output terminal of the amplifier comparator 241 is connected to the PWM circuit 221 via the transistor 243 and the optoelectrical coupler 244.

The constant voltage circuit 242 includes a first resistor 2421 and a second resistor 2422 connected in series, and a diode 2423 connected with the first and second resistors 2421, 2422 in parallel. A negative input terminal of the amplifier comparator 241 is connected to a node between the first resistor 2421 and the second resistor 2422. The constant voltage circuit 242 generates a reference voltage, and provides the reference voltage to the negative input terminal of the amplifier comparator 241 via the node between the first resistor 2421 and the second resistor 2422. When a current traveling through the load component 210 changes, the amplifier comparator 241 compares a voltage of the negative input terminal and a voltage of the positive input terminal, generates a feedback signal, and provides the feedback signal to the PWM circuit 221 via the transistor 243 and the optoelectrical coupler 244. The PWM circuit 221 adjusts the direct current supply from the power output terminal 222 to stabilize the current traveling through the load component 210.

In the illustrated embodiment, a resistance of the first resistor 2421 is 1000Ω, and the second resistor 2422 is an adjustable resistor. The second resistor 2422 can be adjusted in the range from 34~2000Ω. Accordingly, the reference voltage of the negative input terminal of the amplifier comparator 241 can be adjusted in the range from 0.02V~0.4V. A constant current traveling through the load component 210 can be controlled by adjusting the reference voltage. For example, if the resistance of the second resistor 2422 is 1000Ω, the charging circuit 200 provides a current of 2A to the load component 210, and an internal resistance of the load component 210 cannot influence the current. If the resistance of the second resistor 2422 is 2000Ω, the charging circuit 200 provides a voltage of 18V to the load component 210, and a maximum power applied to the load component 210 is 36 W.

Unlike with the above-described conventional charging circuit 100, the charging circuit 20 does not includes a powerful transistor, and therefore does not need a large heat sink. Thus, a volume of space required by the charging circuit 20 is reduced. In addition, the charging circuit 20 includes the optoelectrical coupler 244 for electrically isolating the power supply unit 220 and the feedback circuit, thus preventing the feedback circuit from interfering with the power supply unit 220. Moreover, because the second resistor 2422 is an adjustable resistor, the reference voltage of the negative input terminal of the amplifier comparator 241 can be adjusted by adjusting the second resistor 2422. Thus, the constant current traveling through the load component 210 can be conveniently controlled.

Figure 2:
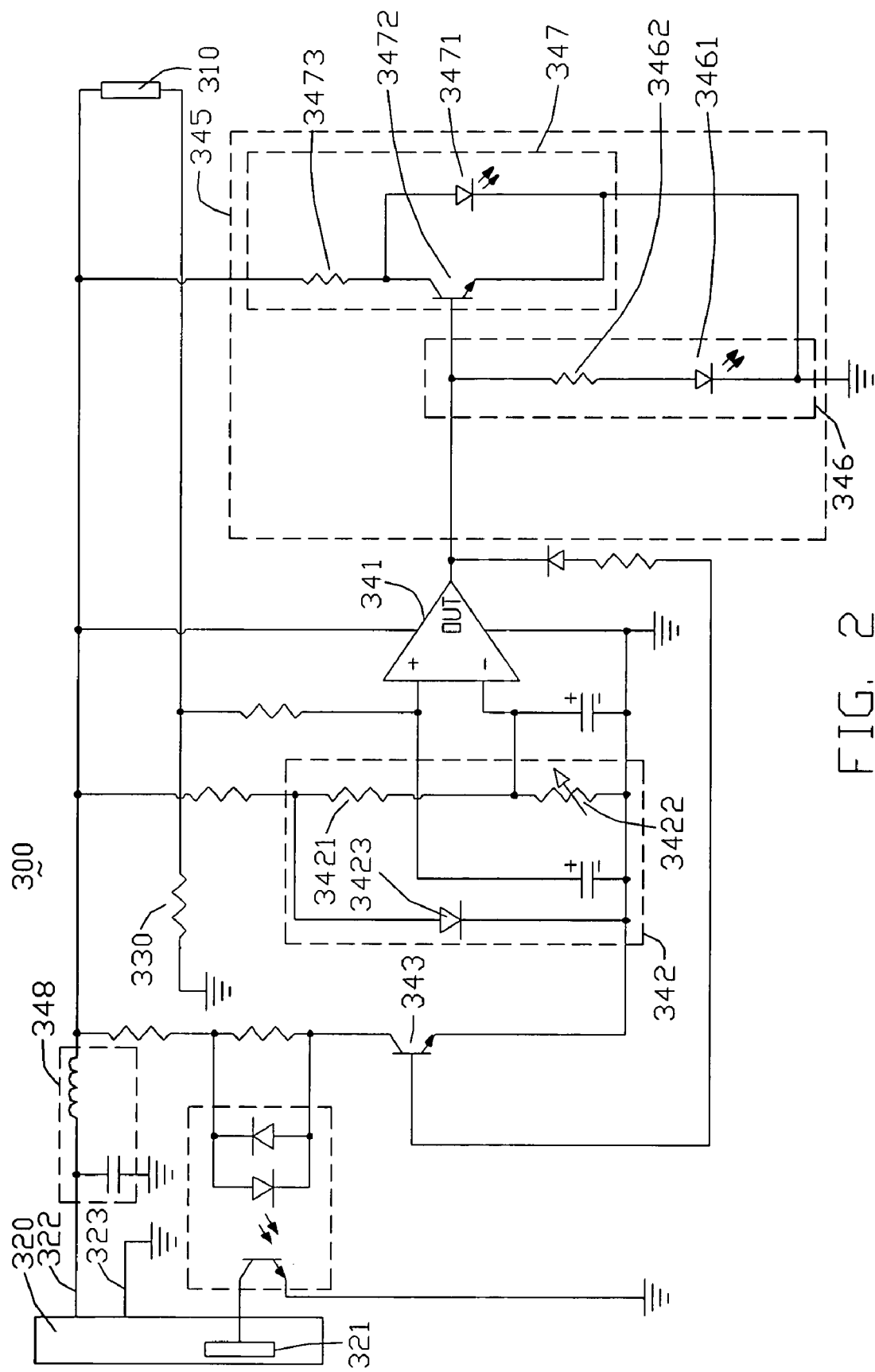
FIG. 2 is a diagram of a charging circuit according to a second embodiment of the present invention.
Figure 3:
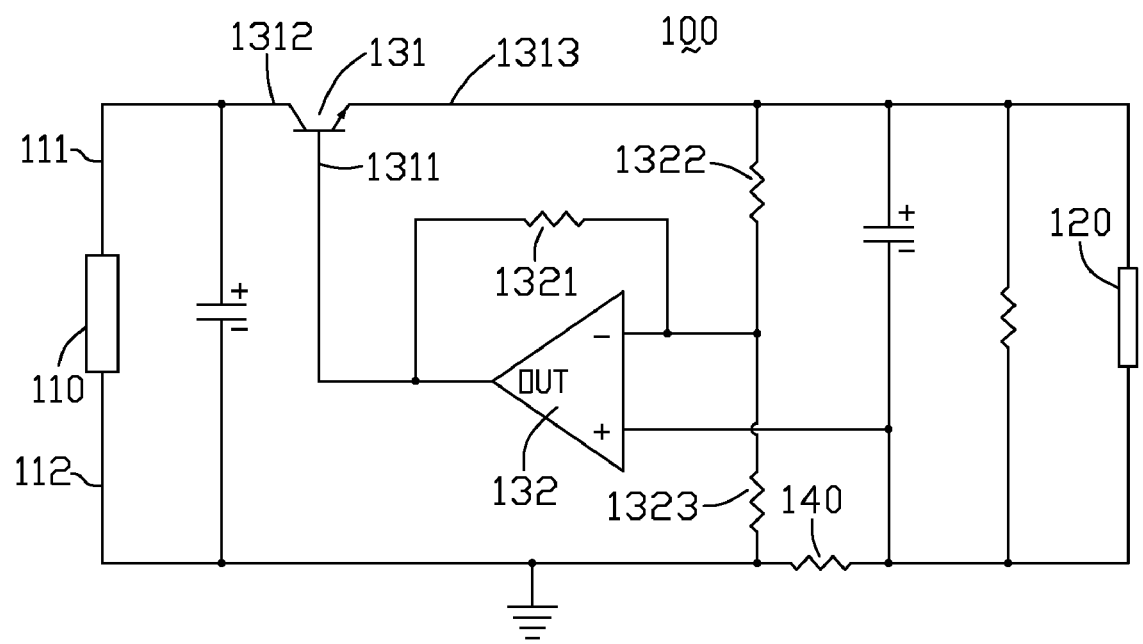
FIG. 3 is a diagram of a charging circuit of a conventional battery charger.

Referring to FIG. 2, a charging circuit 300 according to a second embodiment of the present invention is shown. The charging circuit 300 is similar to charging circuit 200 of the first embodiment. However, the charging circuit 300 further includes a monitoring circuit 345. The monitoring circuit 345 includes a first monitoring circuit 346 and a second monitoring circuit 347.

The first monitoring circuit 346 includes a red light emitting diode (LED) 3461 and a current-limiting resistor 3462. An output terminal of an amplifier comparator 341 of the charging circuit 300 is grounded via the current-limiting resistor 3462 and the red LED 3461 in series in that order.

The second monitoring circuit 347 includes a green LED 3471, a switching transistor 3472, and a bias resistor 3473. The green LED 3471 is connected between a source electrode and a drain electrode of the switching transistor 3472. The source electrode of the switching transistor 3472 is connected to a power output terminal 322 of the charging circuit 300 via the bias resistor 3473. The drain electrode of the switching transistor 3472 is grounded. A gate electrode of the switching transistor 3472 is connected to the output terminal of the amplifier comparator 341.

Because the load component 310 is a rechargeable battery, an internal resistance of the load component 310 increases when the load component 310 is charged. When the inherent resistance of the load component 310 is less than a predetermined value, e.g. 9Ω, a voltage of a positive input terminal of the amplifier comparator 341 is greater than a reference voltage of a negative input terminal of the amplifier comparator 341. Therefore the output terminal of the amplifier comparator 341 has a high voltage. Thus the charging circuit 300 works in a constant-current state, and the red LED 3461 emits light. As the charging time progressively elapses, the inherent resistance of the load component 310 eventually exceeds the predetermined value, e.g. 9Ω. From this time on, the output terminal of the amplifier comparator 341 has a low voltage, and thus the green LED 3471 emits light.

The charging circuit 300 includes the red and green LEDs 3461, 3471 for monitoring the effect of the charging circuit 300 on the load component 310. This gives the charging circuit 300 improved ease of use.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A charging circuit for charging a load component, the charging circuit comprising:
   a power supply unit comprising a pulse width modulation circuit and a power output terminal configured to output a direct current supply;
   a feedback circuit comprising an amplifier comparator, a constant voltage circuit, a transistor, and an optoelectrical coupler, the constant voltage circuit being configured to generate a reference voltage and apply the reference voltage to an inverting terminal of the amplifier comparator, an output terminal of the amplifier comparator being connected to a base of the transistor to control the transistor, an emitter of the transistor being grounded, a collector of the transistor being coupled to the optoelectrical coupler, the optoelectrical coupler being connected to the pulse width modulation circuit; and
   a sampling resistor comprising a current sampling terminal connected to a non-inverting terminal of the amplifier comparator, and a grounded terminal, the current sampling terminal also being connected to the power output terminal via the load component;
   wherein the charging circuit is configured such that when the load component is coupled to the direct current supply of the charging circuit and a direct current traveling through the load component changes, the amplifier comparator generates a feedback signal and applies the feedback signal to the pulse width modulation circuit via the transistor and the optoelectrical coupler, and the pulse width modulation circuit adjusts the direct current supply output from the power output terminal according to the feedback signal to stabilize the direct current traveling through the load component.

2. The charging circuit as claimed in claim 1, wherein the constant voltage circuit comprises a first resistor and a second resistor connected in series, and a diode connected in parallel with the first and second resistors.

3. The charging circuit as claimed in claim 2, wherein a node between the first resistor and the second resistor is connected directly to the inverting terminal of the amplifier comparator.

4. The charging circuit as claimed in claim 2, wherein a resistance of the first resistor is 1000Ω.

5. The charging circuit as claimed in claim 4, wherein the second resistor is an adjustable resistor.

6. The charging circuit as claimed in claim 5, wherein the second resistor has an adjustable resistance in the range from 34~2000Ω.

7. The charging circuit as claimed in claim 1, further comprising a red light emitting diode, wherein the output terminal of the amplifier comparator is grounded via the red light emitting diode.

8. The charging circuit as claimed in claim 7, further comprising a switching transistor and a green light emitting diode connected between a collector and an emitter of the switching transistor.

9. The charging circuit as claimed in claim 8, wherein the collector of the switching transistor is connected to the power output terminal, a base of the switching transistor is connected to the output terminal of the amplifier comparator, and the emitter of the switching transistor is grounded.

10. The charging circuit as claimed in claim 9, further comprising a bias resistor, wherein the collector of the switching transistor is connected to the power output terminal via the bias resistor.

11. The charging circuit as claimed in claim 1, further comprising a rectifier-filter circuit for rectifying and filtering the direct current supply output from the power output terminal.

12. The charging circuit as claimed in claim 1, wherein the load component is a rechargeable battery.

13. The charging circuit as claimed in claim 12, wherein the load component is a lithium ion rechargeable battery.

14. The charging circuit as claimed in claim 12, wherein the load component is a nickel-cadmium rechargeable battery.

15. The charging circuit as claimed in claim 1, wherein the pulse width modulation circuit is integrated in the power supply unit by a full bridge rectifier circuit.

16. The charging circuit as claimed in claim 1, wherein the pulse width modulation circuit is integrated in the power supply unit by a half bridge rectifier circuit.

17. The charging circuit as claimed in claim 1, wherein the power supply unit further comprising a grounding terminal connected the ground.

18. A charging circuit for charging a load component, the charging circuit comprising:
   a power supply unit comprising a power output terminal configured to output a direct current supply and a pulse width modulation circuit configured to adjust the direct current supply to stabilize a current traveling through the load component;
   a feedback circuit comprising an amplifier comparator, a constant voltage circuit, a transistor, and an optoelectrical coupler, the constant voltage circuit being configured for generating a reference voltage and applying the reference voltage to an inverting terminal of the amplifier comparator, an output terminal of the amplifier comparator being connected to a base of the transistor to control the open and close states of the transistor, an emitter of the transistor being grounded, a collector of the transistor being coupled to the optoelectrical coupler, the optoelectrical coupler being connected to the pulse width modulation circuit; and
   a sampling resistor comprising a current sampling terminal connected to a non-inverting terminal of the amplifier comparator, the sampling resistor being configured to detect the current traveling through the load component, and feedback a detected voltage corresponding to the current to the non-inverting terminal of the amplifier comparator.

19. The charging circuit as claimed in claim 2, wherein a first terminal of the first resistor is connected to the power output terminal, the other terminal of the first resistor is directly connected to the second resistor which is directly grounded, an anode of the diode is directly connected to the first terminal of the first resistor, and a cathode of the diode is directly grounded.

20. A charging circuit for charging a load component, the charging circuit comprising:
   a power supply unit comprising a pulse width modulation circuit and a power output terminal configured to supply a direct current supply to a positive input terminal of the load component;
   a sampling resistor connected between a negative input terminal of the load component and ground, the sampling resistor being configured to detect a current flowing through the load component and generate a sampling voltage representing the current;
   a transistor comprising a grounded emitter, a base, and a collector connected to the power output terminal via a first resistor;
   an optoelectrical coupler comprising two input terminals connected to the two end terminals of the first resistor, and an output terminal connected to the pulse width modulation circuit;
   an amplifier comparator comprising an inverting terminal configured to receive a constant reference voltage, a non-inverting terminal configured to receive the sampling voltage from the sampling resistor, and an output terminal connected to the base of the transistor.

* * * * *